United States Patent
Lee et al.

(10) Patent No.: US 6,785,211 B2
(45) Date of Patent: Aug. 31, 2004

(54) AUTOMATIC POWER CONTROL APPARATUS OF DISC DRIVE

(75) Inventors: Jong-hoon Lee, Seoul (KR); Sung-ro Go, Gyeonggi-do (KR); Kyoung-bok Jin, Gyeonggi-do (KR); Ki-bong Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 09/917,267

(22) Filed: Jul. 30, 2001

(65) Prior Publication Data

US 2002/0105880 A1 Aug. 8, 2002

(30) Foreign Application Priority Data

Feb. 7, 2001 (KR) .......................................... 2001-5942

(51) Int. Cl.[7] .................................................. G11B 3/90
(52) U.S. Cl. .................................... 369/53.26; 369/47.5
(58) Field of Search ............................. 369/47.49, 47.5, 369/47.51, 47.52, 47.55, 53.26, 53.27, 116

(56) References Cited

U.S. PATENT DOCUMENTS 4,935,915 A * 6/1990 Fujiwara et al. ............ 369/116
5,309,461 A    5/1994 Call et al.

FOREIGN PATENT DOCUMENTS

| EP | 1 136 992 | 9/2001 |
| JP | 4-62518 | 5/1992 |
| JP | 9-45980 | 2/1997 |

OTHER PUBLICATIONS

Patent Abstract of Japan for Japanese Publication 4345930, published Jan. 1992.
Patent Abstract of Japan for Japanese Publication 2000–30277, published Jan. 2000.
Patent Abstract of Japan for Japanese Publication 61016044, published Jan. 1986.
Patent Abstract of Japan for Japanese Publication 10200179, published Jul. 1998.

* cited by examiner

Primary Examiner—Paul W. Huber
(74) Attorney, Agent, or Firm—Staas & Halsey LLP

(57) ABSTRACT

An automatic power control (APC) apparatus reducing time necessary for stabilizing an APC circuit at the initial stage of automatic power control of a disc drive is provided. The APC circuit is designed such that a voltage of a predetermined percent of an expected output voltage is previously added to an APC output voltage of the APC circuit of a laser diode, thereby greatly reducing a stabilizing time necessary for stabilizing an APC output voltage at an initial stage in a write or read mode. Therefore, the loss of data in a high speed write or read mode can be reduced. Particularly, the loss of data in a high speed write mode can be greatly reduced.

21 Claims, 2 Drawing Sheets

FIG. 1 (PRIOR ART)
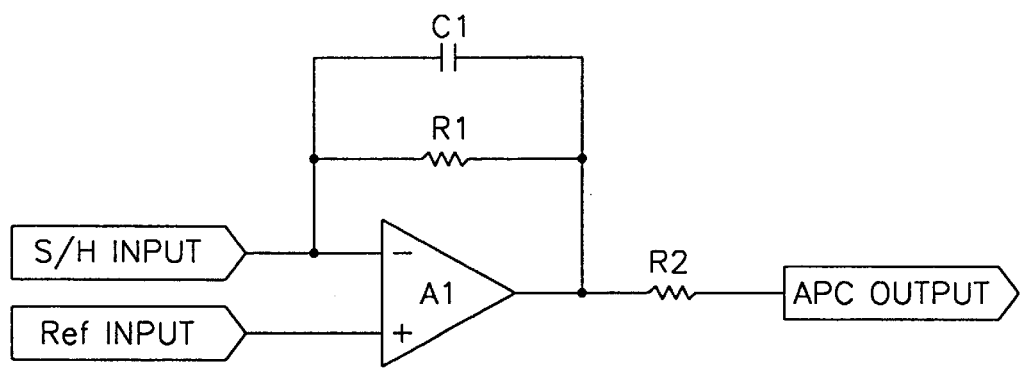
FIG. 2A Ref
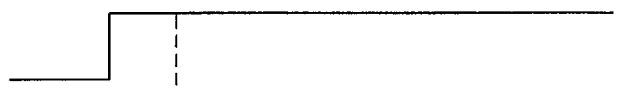
FIG. 2B BEGINNING OF APC
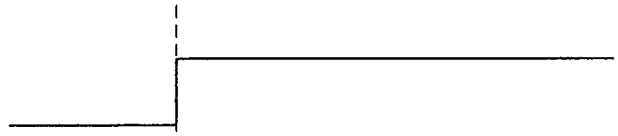
FIG. 2C APC OUTPUT
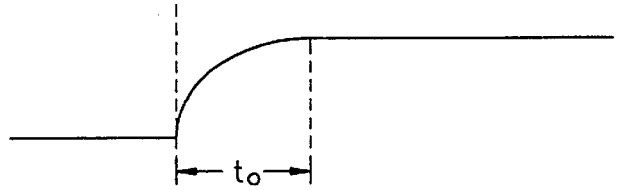

FIG. 3
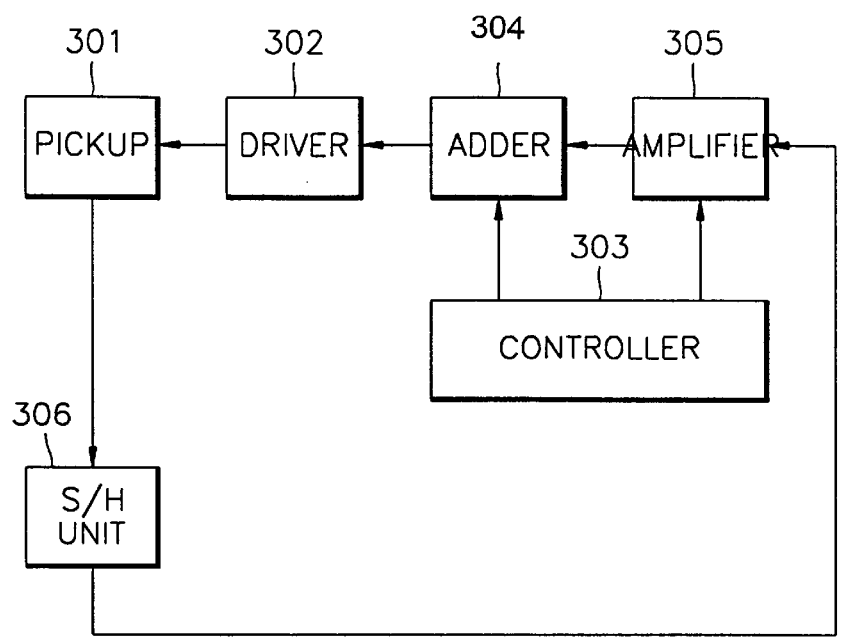
FIG. 4A  STABILIZING
COMPENSATION
VOLTAGE
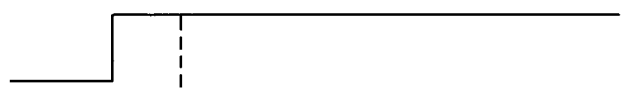
FIG. 4B  Ref
FIG. 4C  BEGINNING OF APC
FIG. 4D  APC OUTPUT
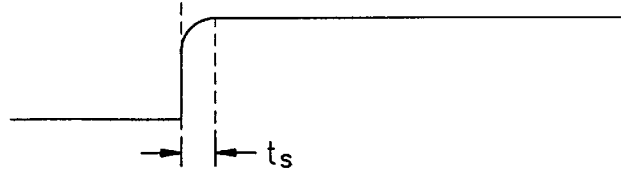

AUTOMATIC POWER CONTROL APPARATUS OF DISC DRIVE

CROSS REFERENCE TO RELATED APPLICATION

This application claims the benefit of Korean Patent Application No. 2001-5942 filed on Feb. 7, 2001, in the Korean Industrial Property Office, the disclosure of which is incorporated herein by reference.

BACKGROUND OF THE INVENTION

1. Field of the Invention

The present invention relates to a disc drive, and more particularly, to an automatic power control apparatus reducing the time necessary for stabilizing an automatic power control circuit at the initial stage of automatic power control of a disc drive.

2. Description of the Related Art

Disc drives such as CD drives, DVD drives, CD-ROM drives and DVD-ROM drives write and read data to and from a disc by use of write signals to the disc or read signals from the disc using light. Disc drives write data to a disc by radiating light on the disc from the laser diode and read data from the disc by applying an optical signal to the disc from the laser diode with current lower than a writing power, converting light reflected from the disc into an electrical signal using a light receiving diode (i.e., a photodetector), and processing the signal. Such disc drives essentially need an automatic power control (APC) circuit to automatically control driving current of the laser diode to control the power of an optical signal output from the laser diode to be constant in a write or read mode.

As shown in FIG. 1, a conventional APC apparatus includes an operational (OP) amplifier A1, resistors R1 and R2, and a capacitor C1. A reference voltage Ref is applied to the non-inverted input terminal of the OP amplifier A1 as shown in FIG. 2A, and a sampling and holding (S/H) voltage of a signal that monitors writing power is applied to the inverted input terminal of the OP amplifier A1, thus providing a beginning signal shown in FIG. 2B.

Once a command for a write mode is input to a disc drive, an output voltage gradually increases depending on a time constant which is determined by the resistor R1 and the capacitor C1 starting from a point when APC in the write mode begins, as shown in FIG. 2C.

An APC stabilizing time (i.e., $t_o$ in FIG. 2C) considerably influences the quality of writing. As the APC stabilizing time becomes shorter, an amount of lost data can be reduced. Particularly, as the speed factor of a disc drive gradually increases to 8×and then to, 12×, the APC stabilizing time at an initial stage of a write mode increasingly influences the writing quality.

Accordingly, since a conventional APC apparatus needs some time starting from a point when APC begins until laser power is stabilized, an error occurs before the power of a laser diode reaches a predetermined level due to a deficiency of the output power of the laser diode in a write mode.

SUMMARY OF THE INVENTION

Accordingly, it is an object of the present invention to provide an automatic power control apparatus reducing a stabilizing time at an initial stage of automatic power control of a laser diode in a disc drive by initially applying an additional predetermined voltage to an automatic power control circuit.

Additional objects and advantages of the invention will be set forth in part in the description which follows and, in part, will be obvious from the description, or may be learned by practice of the invention.

The foregoing objects of the present invention are achieved by providing an automatic power control apparatus of a disc drive, including a controller generating an automatic power control reference voltage signal and a stabilizing compensation voltage signal which are suitable for a selected mode; an amplifier receiving the automatic power control reference voltage signal from the controller, and a signal which is obtained by sampling a writing section of a monitor signal that estimates the level of the output power of a laser diode, through its two input terminals, respectively, and amplifying the voltage difference between the two signals at its input terminals with predetermined gain; and an adder summing the output of the amplifier and the stabilizing compensation voltage signal and outputting the result of the summation to a laser diode driving circuit.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a diagram of the configuration of a conventional automatic power control apparatus of a disc drive according to prior art;

FIGS. 2A through 2C are waveform diagrams of main signals of the automatic power control apparatus shown in FIG. 1;

FIG. 3 is a diagram of the configuration of an automatic power control apparatus of a disc drive according to the present invention; and FIGS. 4A through 4C are waveform diagrams of main signals of the automatic power control apparatus shown in FIG. 3.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

As shown in FIG. 3, an automatic power control apparatus of a disc drive according to the present invention includes a pickup 301, a driver 302, a controller 303, an adder 304, an amplifier 305 and a sampling and holding (S/H) unit 306. The amplifier 305 may be realized as an operational (OP) amplifier.

Although not shown in detail, the pickup 301 includes a laser diode, a photo diode providing optical detection, and a variety of optical instruments. The pickup 301 is controlled to move in horizontal and vertical directions by a tracking control signal and a focus control signal.

Once a user inputs a command for a write mode into the controller 303, the controller 303 sets automatic power control (APC) reference voltage data, which an APC circuit controlling the power of the laser diode needs, and also sets stabilizing compensation voltage data, and converts the APC reference voltage data and the stabilizing compensation voltage data into analog signals, thereby generating an APC reference voltage signal Ref shown in FIG. 4B and a stabilizing compensation voltage signal shown in FIG. 4A. In other words, the controller 303 includes a digital-to-analog converter that converts the APC reference voltage data and the stabilizing compensation voltage data, which are digital signals, into analog signals.

Here, the APC reference voltage data set in a write mode is different from that set in a read mode. The stabilizing compensation voltage data is set to a voltage value having a predetermined level, which is lower than that of an APC output voltage applied to the laser diode driver 302, in a write mode. The stabilizing compensation voltage data should be set not to go beyond the control range of an APC loop due to external disturbance. For example, it is effective to set the stabilizing compensation voltage data to be no greater than 90% of an expected APC output voltage. In an embodiment of the present invention, the stabilizing compensation voltage data is set to 90% of the APC output voltage.

The controller 303 applies the APC reference voltage signal to the amplifier 305 and applies the stabilizing compensation voltage signal to the adder 304.

The S/H unit 306 is provided to generate a monitor signal estimating the power level of an optical signal output from the laser diode of the pickup 301. The S/H unit 306 receives a signal from the photo diode of the pickup 301, amplifies and inverts the input signal, and then samples and holds the signal in a writing section before outputting it to the amplifier 305.

Then, the amplifier 305 amplifies the voltage difference between the APC reference voltage signal and the signal sampled and held in the writing section, which are input through its two input terminals, respectively, and outputs the amplified result.

The adder 304 adds the output voltage from the amplifier 305 to the stabilizing compensation voltage from the controller 303 and outputs the resultant signal to the driver 302.

The APC output voltage, to which the stabilizing compensation voltage reaching 90% of an expected output level is added by the adder 304, is input to the driver 302 so that the APC output voltage has a level corresponding to 90% of the expected output level at the beginning point of APC corresponding to an initial point when writing starts, as shown in FIG. 4C. Accordingly, only a stabilizing time is shown in FIG. 4D necessary for increasing the APC output voltage by the remaining 10% voltage is needed. Consequently, the present invention reduces a stabilizing time to about 1/10 of that necessary according to conventional systems in which a stabilizing compensation voltage is not previously applied.

The driver 302 converts the voltage applied from the adder 304 into a laser diode driving current and outputs the laser diode driving current to the laser diode of the pickup 301. Then, the laser diode generates an optical signal having a writing power corresponding to the laser diode driving current applied thereto. The optical signal is applied to a disc through an optical system, thereby writing data to the disc.

Consequently, the APC control circuit constructs a closed circuit so that a signal, which is obtained by monitoring the power of an optical signal output from the laser diode and then which is sampled and held, is fed back to the amplifier 305 for automatic power control. Therefore, the optical power of the laser diode can be automatically controlled in a write mode.

Although only an operation of automatically controlling the power of a laser diode in a write mode is described in this specification, the present invention can automatically control the power of the laser diode in both write and read mode in the same manner. Accordingly, it is apparent that a stabilizing time necessary at an initial stage in a read mode can be reduced by applying a stabilizing compensation voltage to an APC circuit.

As described above, according to the present invention, an APC circuit is designed such that a voltage equal to a predetermined percentage of an expected output voltage is initially added to an APC output voltage of the APC circuit of a laser diode, thereby greatly reducing a stabilizing time necessary for stabilizing an APC output voltage at an initial stage in a write or read mode according to conventional systems. Therefore, the present invention can reduce the loss of data in a high speed write or read mode. Particularly, the present invention can greatly reduce the loss of data in a high speed write mode.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. An automatic power control apparatus of a disc drive having a pickup with a laser diode powered by a laser diode driving circuit, for writing information on a disc and/or reading the information from the disc, the automatic power control apparatus comprising:

a controller generating an automatic power control reference voltage signal and a stabilizing compensation voltage signal which are suitable for a selected mode;

a sampling and holding circuit sampling a section of a monitor signal estimating a level of an output power of the laser diode to generate a voltage signal;

an amplifier determining a voltage difference between the automatic power control reference voltage signal and the voltage signal, and amplifying the voltage difference with a predetermined gain; and an adder summing the amplified voltage difference, to output the summed result to the laser diode driving circuit.

2. The automatic power control apparatus of claim 1, wherein the controller comprises a digital-to-analog converter which outputs the automatic power control reference voltage signal and the stabilizing compensation voltage signal as analog signals.

3. The automatic power control apparatus of claim 1, wherein said selected mode includes either a write mode for writing the information to the disc or a read mode for reading the information from the disc.

4. The automatic power control apparatus of claim 1, wherein the stabilizing compensation voltage signal has a voltage no greater than 90% of an expected automatic power control output voltage in the selected mode.

5. The automatic power control apparatus of claim 1, wherein the pickup further comprises a photodiode; wherein:

the sampling and holding circuit amplifies the output from the photo diode of the pickup.

6. The automatic power control apparatus of claim 5, wherein the monitor signal is inversely proportional to the output power of the laser diode.

7. The automatic power control apparatus of claim 1, wherein the amplifier comprises an operational amplifier having input and output terminals, and a resistor and a capacitor connected in parallel to the input and output terminals of the operational amplifier.

8. The automatic power control apparatus of claim 3, wherein a value of the stabilizing compensation voltage signal in said write mode is different from that in said read mode.

9. An automatic power control (APC) apparatus of a disc drive having an optical pickup with a laser diode, the APC apparatus comprising:

an APC voltage generator generating an APC output voltage signal according to an output of the laser diode;

a controller generating a predetermined voltage signal at an initial stage of a selected mode; and an adder adding the APC output voltage signal and the predetermined voltage signal at the initial stage of the selected mode.

10. The APC apparatus of claim 9, wherein the APC voltage generator comprises:

a sampling and holding circuit sampling a section of a monitor signal estimating a level of an output power of the laser diode, to generate a voltage signal;

the controller generating an APC reference voltage signal; and an amplifier determining a difference between the APC voltage reference signal and the predetermined voltage signal, and amplifying the difference by a gain factor to generate the APC output voltage signal.

11. The APC apparatus of claim 9, wherein the predetermined voltage signal is a predetermined percentage of an expected output level at a beginning point of APC for the selected mode.

12. The APC apparatus of claim 9, wherein the predetermined percentage is approximately 90%.

13. The APC apparatus of claim 11, wherein the selected mode is a write mode and the beginning point corresponds to an initial point when the laser diode writes information on a disc.

14. The APC apparatus of claim 11, wherein the selected mode is a read mode and the beginning point corresponds to an initial point when the laser diode reads information from a disc.

15. The APC apparatus of claim 9, wherein a value of the predetermined voltage signal when the selected mode is a write mode is greater than the value of the predetermined voltage signal when the selected mode is a read mode.

16. The APC apparatus of claim 9, wherein the disc drive further comprises a photo diode to receive light emitted by the laser diode and reflected from an optical disc, wherein:

the monitor signal is output by the photo diode.

17. A method of controlling the power of a disc drive, comprising:

generating an automatic power control reference voltage signal and a stabilizing compensation voltage signal suitable for a selected mode;

amplifying the voltage difference between said automatic power control reference voltage signal and a signal obtained by sampling a selected mode section of a monitor signal estimating the level of the output power of a laser diode with a predetermined gain;

obtaining an automatic power control output voltage signal by summing said amplified voltage difference and said stabilizing compensation voltage signal; and providing said automatic power control output voltage signal to a laser diode driving circuit which drives the laser diode.

18. The method according to claim 17, wherein said selected mode includes either writing to a disc or reading from a disc.

19. The method according to claim 18, wherein said stabilizing compensation voltage signal value when writing to the disc is different than when reading from the disc.

20. The method according to claim 19, wherein said stabilizing compensation voltage signal has a value less than or equal to 90% of said automatic power control output voltage signal.

21. The method according to claim 17, wherein the generating comprises converting said automatic power control reference voltage signal and said stabilizing compensation voltage signal from a digital signal to an analog signal, respectively.

* * * * *